United States Patent
Zhang

(10) Patent No.: US 9,312,785 B2
(45) Date of Patent: Apr. 12, 2016

(54) SYNCHRONOUS RECTIFICATION CONTROLLING CIRCUIT AND SYNCHRONOUS RECTIFICATION CONTROLLING METHOD

(71) Applicant: Silergy Semiconductor Technology (Hangzhou) LTD, Hangzhou, ZheJiang Province (CN)

(72) Inventor: Lingdong Zhang, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 169 days.

(21) Appl. No.: 14/268,944

(22) Filed: May 2, 2014

(65) Prior Publication Data

US 2014/0334205 A1 Nov. 13, 2014

(30) Foreign Application Priority Data

May 10, 2013 (CN) .......................... 2013 1 0138826

(51) Int. Cl.
*H02M 7/68* (2006.01)
*H02M 7/217* (2006.01)
*H02M 1/42* (2007.01)
*H05B 33/08* (2006.01)
*H02M 1/00* (2007.01)

(52) U.S. Cl.
CPC ............ *H02M 7/217* (2013.01); *H02M 1/4258* (2013.01); *H02M 1/4266* (2013.01); *H05B 33/0815* (2013.01); *H02M 2001/0025* (2013.01); *Y02B 70/126* (2013.01)

(58) Field of Classification Search
CPC . H02M 7/217; H02M 1/4266; H02M 1/4258; H02M 2001/0025; H05B 33/0815; Y02B 70/126
USPC .......................................................... 363/89
See application file for complete search history.

(56) References Cited

U.S. PATENT DOCUMENTS

| 8,004,862 B2* | 8/2011 | Yang | H02M 3/33592 363/21.06 |
| 8,023,289 B2* | 9/2011 | Yang | H02M 3/33592 363/21.02 |
| 8,077,481 B2* | 12/2011 | Hua | H02M 3/33546 363/15 |
| 8,154,888 B2* | 4/2012 | Yang | H02M 3/33592 363/21.06 |
| 8,416,587 B2 | 4/2013 | Chen | |
| 2005/0128776 A1* | 6/2005 | Dequina | H02M 1/088 363/89 |
| 2009/0001943 A1* | 1/2009 | Slezak | H02M 3/156 323/232 |
| 2014/0003096 A1 | 1/2014 | Deng | |
| 2014/0078788 A1 | 3/2014 | Yao et al. | |
| 2014/0192561 A1* | 7/2014 | Plesnik | H02M 3/33546 363/21.06 |

* cited by examiner

*Primary Examiner* — Jessica Han
*Assistant Examiner* — Lorena Bruner
(74) *Attorney, Agent, or Firm* — Michael C. Stephens, Jr.

(57) ABSTRACT

In one embodiment, a synchronous rectification circuit can include: (i) a sampling circuit configured to sample a voltage across first and second power terminals of a synchronous rectifier, and to generate a first sampling voltage; (ii) an enable controlling circuit configured to delay the first sampling voltage, and to generate a second sampling voltage, and to activate a ramp voltage when the first sampling voltage is higher than the second sampling voltage; (iii) the enable controlling circuit being configured to generate an enable controlling signal in response to a comparison of the ramp voltage against a reference voltage that represents a predetermined light load condition; and (iv) a driving circuit configured to activate a driving signal to turn on the synchronous rectifier when the enable controlling signal and a synchronous rectification open signal are active.

15 Claims, 5 Drawing Sheets

US 9,312,785 B2

SYNCHRONOUS RECTIFICATION CONTROLLING CIRCUIT AND SYNCHRONOUS RECTIFICATION CONTROLLING METHOD

RELATED APPLICATIONS

This application claims the benefit of Chinese Patent Application No. 201310138826.X, filed on May 10, 2013, which is incorporated herein by reference in its entirety.

FIELD OF THE INVENTION

The present invention generally relates to the field of power supplies, and more particularly to a synchronous rectifying circuit and associated rectifying method.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. In this way, the output voltage and/or the output current of the switching power supply can be maintained as substantially constant. Therefore, the selection and design of the particular control circuitry and approach is very important to the overall performance of the switching power supply. Thus, using different detection signals and/or control circuits can result in different control effects on power supply performance.

SUMMARY

In one embodiment, a synchronous rectification circuit can include: (i) a sampling circuit configured to sample a voltage across first and second power terminals of a synchronous rectifier, and to generate a first sampling voltage; (ii) an enable controlling circuit configured to delay the first sampling voltage, and to generate a second sampling voltage, and to activate a ramp voltage when the first sampling voltage is higher than the second sampling voltage; (iii) the enable controlling circuit being configured to generate an enable controlling signal in response to a comparison of the ramp voltage against a reference voltage that represents a predetermined light load condition; and (iv) a driving circuit configured to activate a driving signal to turn on the synchronous rectifier when the enable controlling signal and a synchronous rectification open signal are active.

In one embodiment, method of controlling a synchronous rectifier can include: (i) generating a first sampling voltage by sampling a voltage between first and second power terminals of the synchronous rectifier; (ii) generating a second sampling voltage by delaying the first sampling voltage; (iii) activating a ramp voltage when the first sampling voltage is higher than the second sampling voltage; (iv) generating an enable controlling signal by comparing the ramp voltage against a reference voltage that represents a predetermined light load condition; and (v) activating a driving signal to turn on the synchronous rectifier when the enable controlling signal and a synchronous rectification open signal are active.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
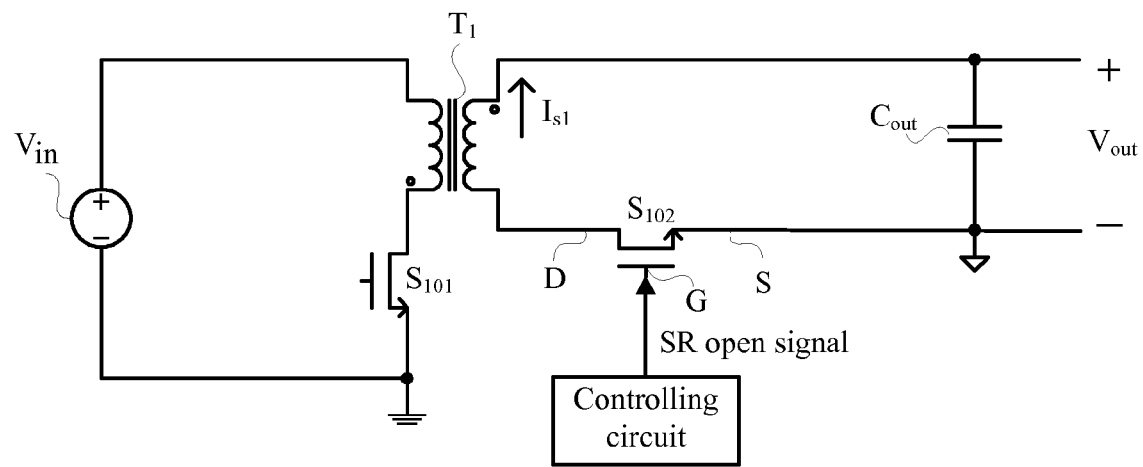
FIG. 1 is a schematic diagram of an example flyback switching power supply with a synchronous rectification circuit.

Referring now to FIG. 1, shown is a schematic diagram of an example flyback switching power supply with a synchronous rectification circuit. Here, NMOS transistor $S_{102}$ of the power stage circuit can be configured as a synchronous rectifier. Further, the on and off states of the synchronous rectifier can be controlled by a controlling circuit. When the open signal output by the controlling circuit (SR open signal) is activated at the gate (G) of synchronous rectifier $S_{102}$, synchronous rectifier $S_{102}$ can be turned on for synchronous rectification.

In this particular example, the synchronous rectification controlling circuit can be for a flyback type of converter, although any suitable converter topology can be employed. Because relatively large noise interference can be generated during current commutation between the primary side and secondary sides of transformer $T_1$ when synchronous rectifier $S_{102}$ is turned on, a minimum on time $T_{on\_min}$ can be employed for normal operation of the synchronous rectification circuit.

When in a light load condition (e.g., no more than a predetermined light load level), the primary peak current can be reduced due to a reduced on or conducting time of primary transistor $S_{101}$. Secondary current $L_{s1}$ may first decrease to zero and then may continuously decrease to become negative. This can lead to the severe variations of the drain-source voltage of synchronous rectifier $S_{102}$, and the system may take a longer time to recover to a stable state due to worsened system stability performance. As a result, the stability and efficiency of the synchronous rectification circuit may be reduced due to possible negative current generated by minimum on time $T_{on\_min}$ in a light load condition in this case.

In one embodiment, a synchronous rectification circuit can include: (i) a sampling circuit configured to sample a voltage across first and second power terminals of a synchronous rectifier, and to generate a first sampling voltage; (ii) an enable controlling circuit configured to delay the first sampling voltage, and to generate a second sampling voltage, and to activate a ramp voltage when the first sampling voltage is higher than the second sampling voltage; (iii) the enable controlling circuit being configured to generate an enable controlling signal in response to a comparison of the ramp voltage against a reference voltage that represents a predetermined light load condition; and (iv) a driving circuit configured to activate a driving signal to turn on the synchronous rectifier when the enable controlling signal and a synchronous rectification open signal are active.

Figure 2:
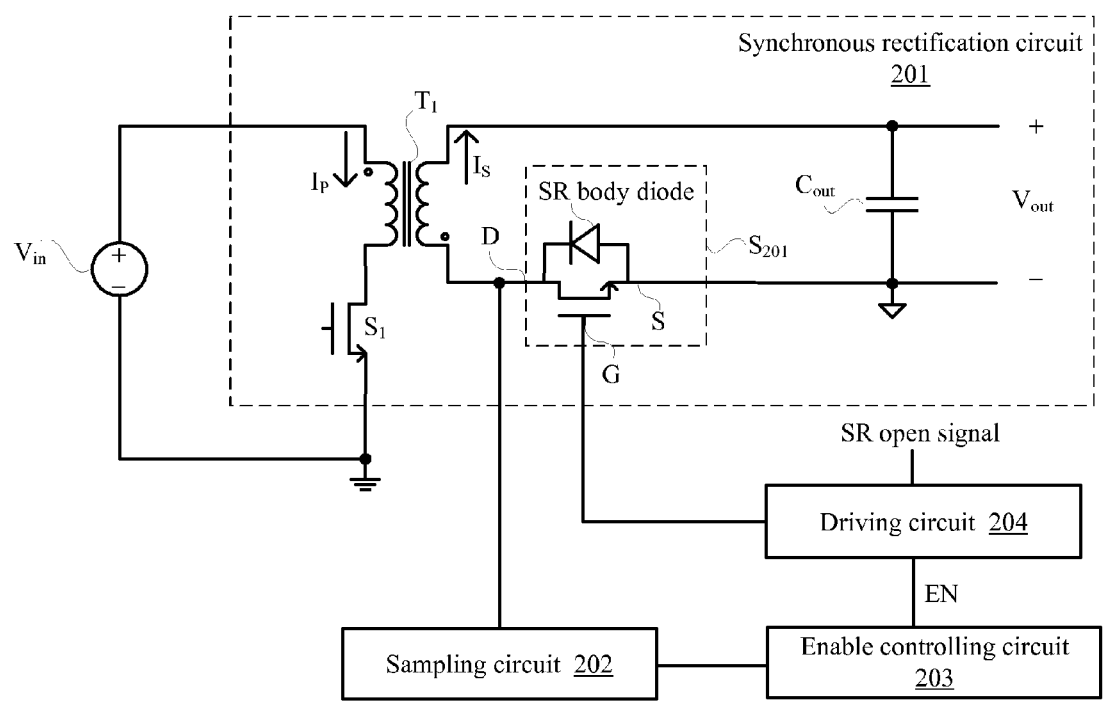
FIG. 2 is a schematic block diagram of a first example synchronous rectification controlling circuit in accordance with the embodiments of the present invention.

Referring now to FIG. 2, shown is a schematic block diagram of a first example synchronous rectification controlling circuit in accordance with the embodiments of the present invention. In this particular example, the synchronous rectification controlling circuit can include synchronous rectification circuit 201, sampling circuit 202, enable controlling circuit 203, and driving circuit 204. Synchronous rectification circuit 201 can include one or more synchronous rectifier (e.g., NMOS transistor) $S_{201}$. Sampling circuit 202 can be configured to sample a voltage between a first power terminal (e.g., drain [D]) and a second power terminal (e.g., source [S]) of the synchronous rectifier to generate a sampling voltage.

In this example, the second power terminal (e.g., source [S]) of the synchronous rectifier can be coupled to ground. Therefore, the voltage of the first power terminal of synchronous rectifier $S_{201}$ can represent the voltage (e.g., $V_{ds}$) between the first and second power terminals. In this way, the sampling voltage (e.g., $V_{ds1}$) can be generated based on a voltage of the first power terminal (e.g., drain [D]) of the synchronous rectifier.

Figure 3:
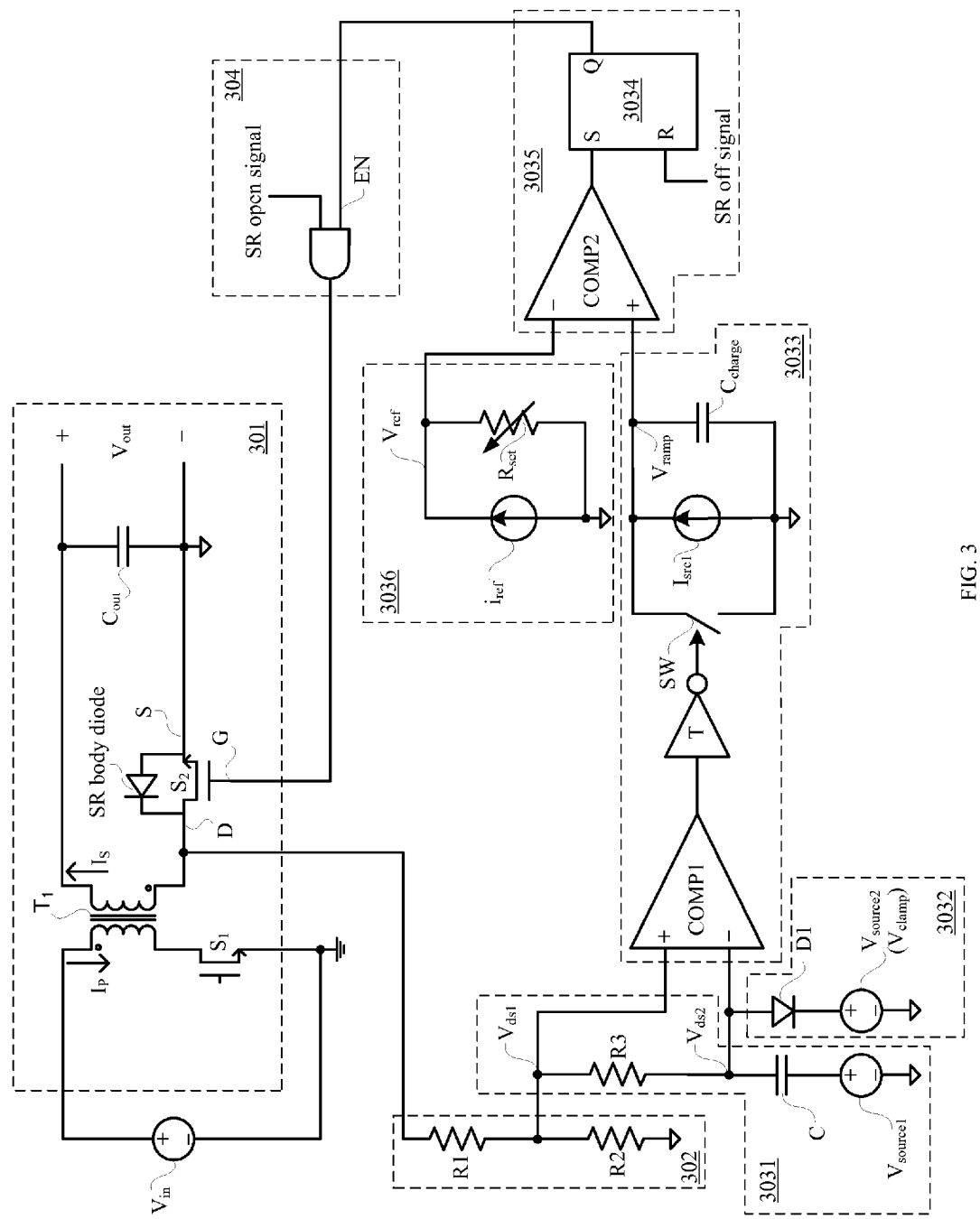
FIG. 3 is a schematic block diagram of a second example synchronous rectification controlling circuit in accordance with embodiments of the present invention.

Referring to FIG. 2 in conjunction with FIG. 3, sampling circuit 202 (302 in FIG. 3) can be configured as a resistor divider. Also, an input of enable controlling circuit 203 can be coupled to sampling circuit 202 to delay sampling signal $V_{ds1}$ in order to generate sampling signal $V_{ds2}$. In addition, slope voltage $V_{ramp}$ can be generated in accordance with a comparison of sampling signal $V_{ds1}$ against sampling signal $V_{ds2}$. Further, an enable controlling signal (EN) can be generated and transferred to driving circuit 204 based on a comparison between ramp voltage $V_{ramp}$ and reference voltage $V_{ref}$.

For example, reference voltage $V_{ref}$ can be determined in accordance with, or may otherwise represent, a predetermined light load condition. In one case, if a full load is represented by Y, a full load current is represented by $I_{max}$, a load of no more than about 20% of the full load can be defined as a light load level. Reference voltage $V_{ref}$ can then be determined according to the formula: $V_{ref}=20\%*I_{max}*R_{set}$, where $R_{set}$ represents a resistance of the full load. The determination of reference voltage $V_{ref}$ can be achieved in many other ways, such that the reference voltage represents a predetermined light load condition based on the output power of a given application.

In this example, sampling circuit 202 can be coupled to the drain of synchronous rectifier $S_{201}$. Thus, sampling signal $V_{ds1}$ can be generated in accordance with the drain voltage of synchronous rectifier $S_{201}$. However, other configurations of sampling circuit 202 (e.g., source or other terminal connections) can also be supported in particular embodiments. Ramp signal $V_{ramp}$ that represents a current load condition can be generated by a comparison between sampling signal $V_{ds1}$ and sampling signal $V_{ds2}$ (e.g., generated by delaying sampling signal $V_{ds1}$).

Therefore, whether the system is in a light load condition can be determined by a comparison between ramp signal $V_{ramp}$ and reference voltage $V_{ref}$. When ramp voltage $V_{ramp}$ is less than reference voltage $V_{ref}$, the circuit can be determined to be in light load condition, and enable controlling signal EN can be deactivated by enable controlling circuit 203. Thus, driving circuit 204 can be disabled, and synchronous rectification circuit 201 may be off as a result.

However, when ramp voltage $V_{ramp}$ is higher than reference voltage $V_{ref}$, the circuit can be determined to not be in such a light load condition. Driving circuit 204 can be enabled in this case because enable controlling signal EN can be activated from enable controlling circuit 203. When the synchronous rectification (SR) open signal is also active, a driving signal from driving circuit 204 can be activated to turn on synchronous rectification circuit 201. Driving circuit 204 can activate the driving signal at the controlling terminal or gate of synchronous rectifier $S_{201}$ to turn on synchronous rectification circuit 201 when both enable controlling signal EN and the SR open signal are active.

In the example, sampling voltage $V_{ds}$ and sampling voltage $V_{ds1}$ related to the current load can be obtained in accordance with a voltage between the first and second power terminals of the synchronous rectifier. Sampling voltage $V_{ds2}$ can be generated by delaying sampling voltage $V_{ds1}$. In addition, ramp voltage $V_{ramp}$ can be generated in accordance with a comparison between sampling voltages $V_{ds1}$ and $V_{ds2}$. For example, sampling voltage $V_{ds2}$ can be representative of a current load condition because sampling voltage $V_{ds1}$ can be related to changes in the current load condition. Whether the circuit is in a light load condition can be determined in accordance with a comparison between ramp voltage $V_{ramp}$ and reference voltage $V_{ref}$ that represents a predetermined light load condition.

Enable controlling signal EN can be provided to driving circuit 204, and may be active or inactive in accordance with the comparison result between ramp voltage $V_{ramp}$ and reference voltage $V_{ref}$. Further, the on and off status of synchronous rectification circuit 201 can be controlled by driving circuit 204 in accordance with the SR open signal and EN signals. When both enable controlling signal EN and SR open signal are active, the driving signal from driving circuit 204 can be activated to turn on synchronous rectification circuit 201. Otherwise, synchronous rectification circuit 201 may be disabled. In this way, the stability and efficiency of a synchronous rectification circuit in a light load condition can be improved, as compared to conventional approaches.

When the ramp voltage related to a current load condition is less than reference voltage $V_{ref}$, the circuit can be determined as being in a light load condition, thus turning off synchronous rectification circuit 201. In this case, a parasitic diode of synchronous rectifier $S_{201}$ can be configured to achieve rectification. Because of the unidirectional conductivity of diodes, no negative current loop can be formed, thus preventing generation of negative current in the light load condition. Avoiding such negative current generation on the secondary side of, e.g., a flyback converter in a light load condition can improve stability and efficiency of the system.

When the ramp voltage related to the current load is higher than the reference voltage, the circuit may be detected as not being in a light load condition. In this case, enable controlling signal EN can be activated by enable controlling circuit 203 to enable driving circuit 204. If SR open signal is also active, synchronous rectification circuit 201 can be turned on to achieve stable and effective synchronous rectification.

Referring now to FIG. 3, shown is a schematic block diagram of a second or more detailed example synchronous rectification controlling circuit, in accordance with embodiments of the present invention. In this particular example, NMOS transistor $S_2$ can be employed as the synchronous rectifier of flyback converter 301. Here, source (S) of synchronous rectifier $S_2$ can be coupled to ground, and the input of sampling circuit 302 can be coupled to drain (D) of synchronous rectifier $S_2$. Also, sampling circuit 302 can be configured as a resistor divider that includes resistors R1 and R2 to sample and divide voltage $V_{ds}$ at the drain (D) of synchronous rectifier $S_2$ to generate sampling voltage of $V_{ds1}$ (see, e.g., waveform 4011 in FIG. 4). Sampling voltage $V_{ds1}$ can then be delayed by delaying circuit 3031 that includes resistor R3, capacitor C, and bias voltage source $V_{source1}$ (e.g., about 100 mV) to generate sampling voltage $V_{ds2}$.

In this particular example, clamping circuit 3032 can include diode D1 and clamping voltage source $V_{source2}$ (with a constant voltage $V_{clamp}$) connected in series to clamp second sampling voltage $V_{ds2}$. When sampling voltage $V_{ds2}$ is greater than constant voltage $V_{clamp}$, sampling voltage $V_{ds2}$ can be clamped to a level of constant voltage $V_{clamp}$ to improve control accuracy and stability. Diode D1 of clamping circuit 3032 can prevent current from flowing from clamping voltage source $V_{source2}$ to comparator COMP1. An example waveform of sampling voltage $V_{ds2}$ being clamped can be shown as in waveform 4012 of FIG. 4.

Sampling voltage $V_{ds1}$ can connect to a non-inverting input of comparator COMP1, and sampling voltage $V_{ds2}$ can connect to an inverting input of comparator COMP1. Divider resistor R3 can connect between sampling voltage $V_{ds1}$ and sampling voltage $V_{ds2}$. In ramp signal generator 3033, an output of comparator COMP1 can connect to an input of inverter T. Controllable switch SW, charging capacitor $C_{charge}$, and current source $I_{src1}$ can connect between a non-inverting input of comparator COMP2, and ground. Switch SW can be controlled by an output of inverter T. When controllable switch SW is off, charging capacitor $C_{charge}$ can be charged by current source $I_{src1}$. Also, the voltage across charging capacitor $C_{charge}$ can be configured as ramp voltage $V_{ramp}$ (see, e.g., waveform 404 of FIG. 4).

Figure 4:
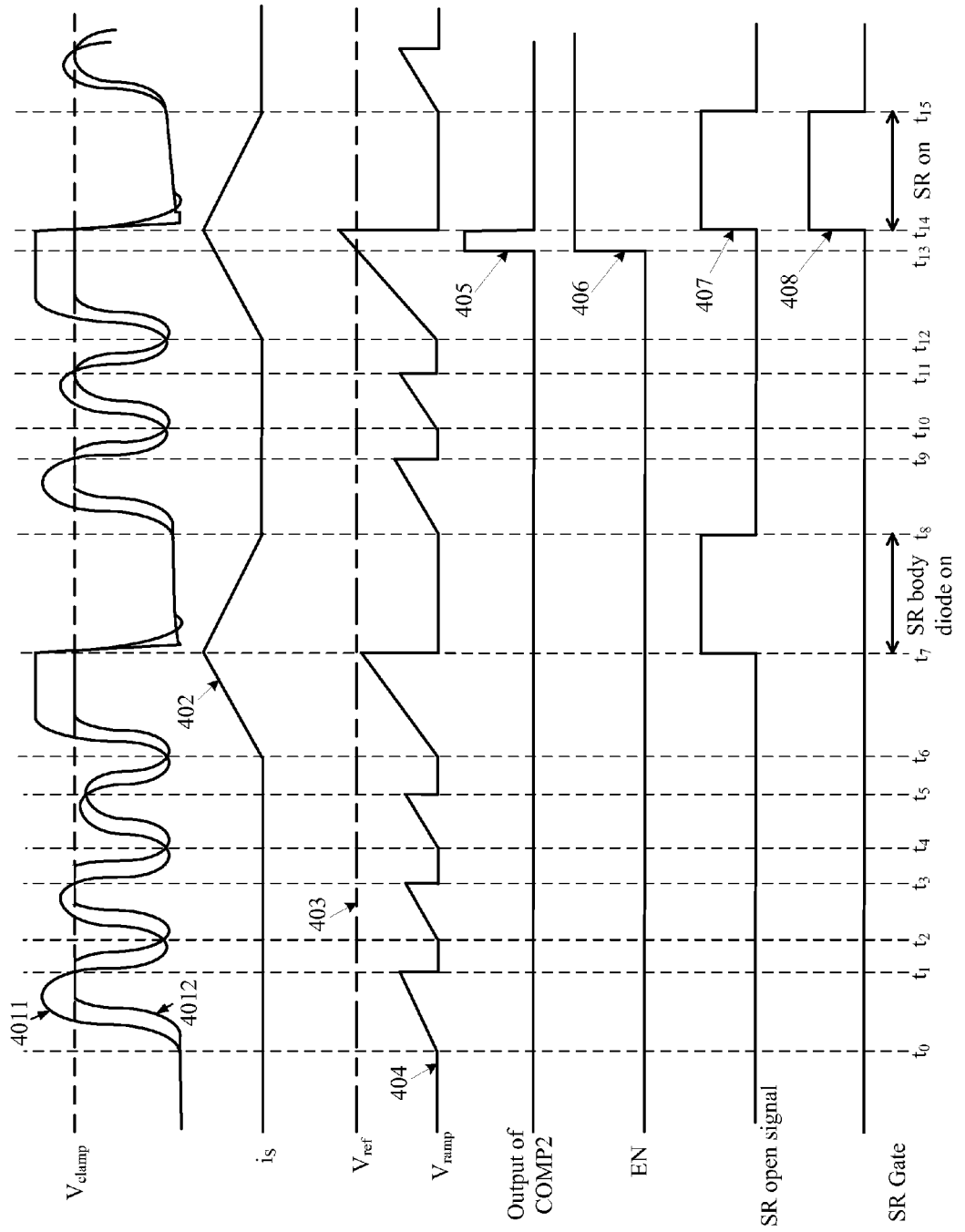
FIG. 4 is a waveform diagram showing example operation of the synchronous rectification controlling circuit of FIG. 3, in accordance with embodiments of the present invention.

Referring now to FIG. 4, shown is a waveform diagram showing example operation of the synchronous rectification controlling circuit of FIG. 3, in accordance with embodiments of the present invention. When sampling voltage $V_{ds1}$ is greater than sampling voltage $V_{ds2}$, the output of comparator COMP1 can go high, which can then be converted to be low by inverter T to turn off controllable switch (e.g., transistor) SW. Charging capacitor $C_{charge}$ can be charged by current source $I_{src1}$ to generate ramp voltage $V_{ramp}$ at the non-inverting input terminal of comparator COMP2. Otherwise, when controllable switch SW is turned off, ramp voltage $V_{ramp}$ can be discharged to ground.

As seen in FIG. 4, during the time interval when sampling voltage $V_{ds1}$ is higher than sampling voltage $V_{ds2}$ (from time $t_0$ to $t_1$), the output of comparator COMP1 can be high, which is then inverted by inverter T to turn off controllable switch SW to allow charging of capacitor $C_{charge}$ by current source $I_{src1}$. In waveform 4011 of sampling voltage $V_{ds1}$, and waveform 4012 of sampling voltage $V_{ds2}$, a duration of the charging of capacitor $C_{charge}$ by current source $I_{src1}$ can be determined by the value of clamping voltage source $V_{clamp}$.

The inverting input terminal of comparator COMP2 can receive reference voltage $V_{ref}$, which can be generated by voltage generator 3036. Voltage generator 3036 can include constant current source $i_{ref}$ and adjustable resistor $R_{set}$, which can be adjusted in accordance with a predetermined output load coupled. Enable controlling signal generator 3035 can be used to generate enable controlling signal EN at the output of comparator COMP2. The set terminal (S) of flip-flop 3034 can connect to an output of comparator COMP2, the reset terminal (R) can receive an SR off reset signal, and the output terminal (Q) can connect to an input (e.g., enable terminal EN) of driving circuit 304.

When ramp voltage $V_{ramp}$ is higher than reference voltage $V_{ref}$, the output of comparator COMP2 can go high (see, e.g., waveform 405). Flip-flop 3034 can be triggered to output a high active enable signal EN (see, e.g., waveform 406) to driving circuit 304 until the reset signal becomes active. When enable controlling signal is activated (at time $t_{13}$) and SR open signal is activated (see, e.g., waveform 407, from time $t_{14}$ to time $t_{15}$) driving signal SR Gate can be activated (see, e.g., waveform 408, from time $t_{14}$ to time $t_{15}$) to turn on the synchronous rectification circuit. Also, an example waveform of transformer secondary current $I_S$ can be as shown in waveform 402, such as from time $t_{14}$ to time $t_{15}$.

When ramp voltage $V_{ramp}$ is less than reference voltage $V_{ref}$ (see, e.g., waveform 403), the output of comparator COMP2 (see, e.g., waveform 405) can go low. The SR open signal can be received by driving circuit 304 (see, e.g., waveform 407, from time $t_7$ to time $t_8$), the synchronous rectification circuit can be off and the parasitic diode (SR body diode) of synchronous rectifier $S_2$ can be employed for rectification performance, if EN is low. Due to unidirectional conductivity of diodes, no negative current loop may be formed on secondary current $I_S$, in order to prevent negative current when in a light load condition. Thus, when secondary current $I_S$ decreases to zero, this current may not continuously decrease, and no negative current can be generated.

In this particular example, the non-inverting input terminal of comparator COMP1 can receive sampling voltage $V_{ds1}$, and the inverting input terminal can receive sampling voltage $V_{ds2}$; however, other configurations and/or circuit implementations can be supported in particular embodiments. For example, the non-inverting input terminal of comparator COMP1 can be configured to receive sampling voltage $V_{ds2}$, and the inverting input terminal can be configured to receive sampling voltage $V_{ds1}$. For such a circuit configuration, inverter T can be configured between comparator COMP1 and controllable switch SW. When the output of comparator COMP1 is low, controllable switch SW can be turned off to charge allow for charging of capacitor $C_{charge}$ by current source $I_{src1}$, and the voltage across charging capacitor can be configured as ramp voltage $V_{ramp}$.

Similarly, in this example, the non-inverting input terminal of comparator COMP2 can receive ramp voltage $V_{ramp}$, and the inverting input terminal can receive reference voltage $V_{ref}$; however, other configurations and/or circuit implementations can be supported in particular embodiments. For example, the non-inverting input terminal of comparator COMP2 can receive reference voltage $V_{ref}$, and the inverting input terminal can be configured to receive ramp voltage $V_{ramp}$. In this case, a flip-flop that can be triggered by a low signal can be employed, and the enable controlling signal can be active low instead of active high.

In one embodiment, method of controlling a synchronous rectifier can include: (i) generating a first sampling voltage by sampling a voltage between first and second power terminals of the synchronous rectifier; (ii) generating a second sampling voltage by delaying the first sampling voltage; (iii) activating a ramp voltage when the first sampling voltage is higher than the second sampling voltage; (iv) generating an enable controlling signal by comparing the ramp voltage against a reference voltage that represents a predetermined light load condition; and (v) activating a driving signal to turn on the synchronous rectifier when the enable controlling signal and a synchronous rectification open signal are active.

Figure 5:
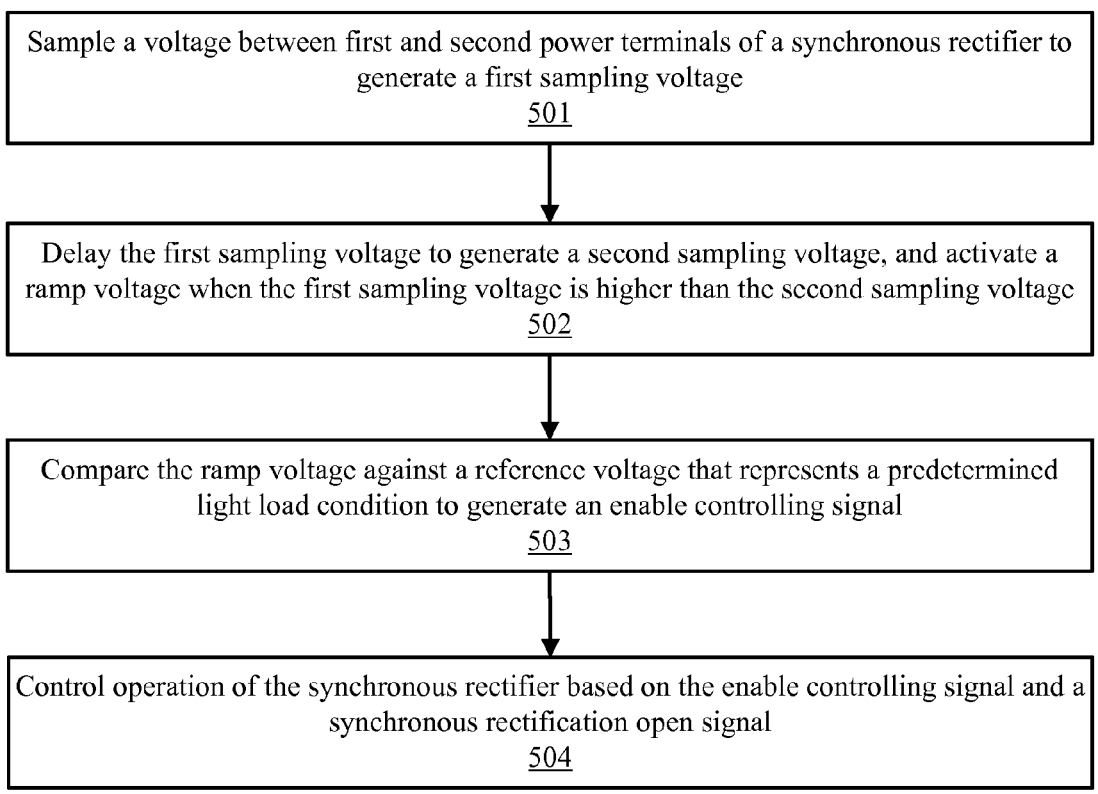
FIG. 5 is a flow diagram of an example method of synchronous rectification control, in accordance with embodiments of the present invention.

Referring now to FIG. 5, shown is a flow diagram of an example method of synchronous rectification control, in accordance with embodiments of the present invention. At 501, a voltage between the first and second power terminals (e.g., transistor drain and source) of a synchronous rectifier (e.g., $S_{201}/S_2$) can be sampled circuit to generate a sampling voltage (e.g., $V_{ds1}$). The synchronous rectification circuit can include one or more synchronous rectifiers or transistors. Also, the second power terminal (e.g., source) of the synchronous rectifier can be coupled to ground such that the voltage on the first power terminal (e.g., drain) can be representative of the voltage between the first and second power terminals.

At 502, sampling voltage $V_{ds1}$ can be delayed to generate sampling voltage $V_{ds2}$. Also, when the sampling voltage $V_{ds1}$ is higher than sampling voltage $V_{ds2}$, a ramp voltage (e.g., $V_{ramp}$) can be generated. For example, sampling voltage $V_{ds1}$ can be divided by a dividing resistor (e.g., R3), and then delayed by a delaying circuit including capacitor (C) and bias voltage source ($V_{source1}$) coupled in series. In this example, the second sampling voltage (e.g., $V_{ds2}$) can also be clamped by a clamping circuit that includes diode D1 and clamping voltage source $V_{source2}$ coupled in series.

In one example implementation, the first second sampling voltages can be compared by the comparator COMP1 to generate an output signal that controls controllable switch SW. When controllable switch SW is off, charging capacitor $C_{charge}$ can be charged by current source $I_{src1}$, and the voltage across charging capacitor $C_{charge}$ can be configured as ramp voltage $V_{ramp}$ (see, e.g., enable controlling circuit 203, delaying circuit 3031, clamping circuit 3032, and ramp signal generator 3033).

At 503, the ramp voltage can be compared against a reference voltage (e.g., $V_{ref}$) that represents a predetermined light load condition, in order to generate an enable controlling signal (e.g., EN). Also, the reference voltage can be generated by a voltage generator (e.g., 3036) that includes a constant current source and an adjustable resistor that can be adjusted in accordance with an output load (e.g., at $V_{out}$). The ramp voltage and the reference voltage can be compared by a comparator, the output signal of which can be coupled to the set terminal of a flip-flop. When the ramp voltage is higher than the reference voltage, the flip-flop can be triggered to activate the enable controlling signal (see, e.g, enable controlling circuit 203/enable controlling signal generator 3035).

At 504, operation of the synchronous rectifier can be controlled based on the enable controlling signal and the synchronous rectification open signal. For example, when both the enable controlling signal and the synchronous rectification open signal are active, the synchronous rectification circuit can be turned on. Sampling voltage $V_{ds1}$ (e.g., representative of the current load) and sampling voltage $V_{ds2}$ can be compared to generate ramp voltage $V_{ramp}$ (e.g., representative of current load). Ramp voltage $V_{ramp}$ can then be compared against reference voltage $V_{ref}$, which can be predetermined in accordance with a light load condition, to determine whether the circuit is operating in a light load condition.

In operation, when ramp voltage $V_{ramp}$ is less than reference voltage $V_{ref}$, a light load condition may be detected. In this case, enable controlling signal EN can be deactivated and the synchronous rectifier (e.g., $S_{201}/S_2$) can be turned off. In this case, the parasitic diode of the synchronous rectifier can be employed for rectification. Also, because secondary current $I_S$ can only conduct one way due to the parasitic diode, no negative current loop can be formed to prevent negative current in such a light load condition. When ramp voltage $V_{ramp}$ is greater than reference voltage $V_{ref}$, no light load condition may be detected. In this case, the load may be average or heavy, and enable controlling signal can be activated to enable driving circuit 204/304.

The embodiments were chosen and described in order to best explain the principles of the invention and its practical applications, to thereby enable others skilled in the art to best utilize the invention and various embodiments with modifications as are suited to the particular use contemplated. It is intended that the scope of the invention be defined by the claims appended hereto and their equivalents.

What is claimed is:

1. A synchronous rectification circuit, comprising:
  a) a sampling circuit configured to sample a voltage across first and second power terminals of a synchronous rectifier, and to generate a first sampling voltage;
  b) an enable controlling circuit configured to delay said first sampling voltage, and to generate a second sampling voltage, and to activate a ramp voltage when said first sampling voltage is higher than said second sampling voltage;
  c) said enable controlling circuit being configured to generate an enable controlling signal in response to a comparison of said ramp voltage against a reference voltage that represents a predetermined light load condition; and
  d) a driving circuit configured to activate a driving signal to turn on said synchronous rectifier when said enable controlling signal and a synchronous rectification open signal are active.

2. The synchronous rectification circuit of claim 1, wherein said second power terminal is coupled to ground.

3. The synchronous rectification circuit of claim 1, wherein said enable controlling circuit comprises:
  a) a delaying circuit configured to delay said first sampling voltage to generate said second sampling voltage;
  b) a first comparison circuit configured to compare said first sampling voltage against said second sampling voltage;
  c) a ramp signal generator configured to activate said ramp voltage when said first sampling voltage is higher than said second sampling voltage, in response to an output from said first comparison circuit; and
  d) a second comparison circuit configured to compare said ramp voltage against said reference voltage to generate said enable controlling signal.

4. The synchronous rectification circuit of claim 3, wherein:
  a) said delaying circuit comprises a capacitor and a bias voltage source coupled in series, wherein said capacitor is coupled to said second sampling voltage;
  b) said ramp signal generator comprises a controllable switch, a charging capacitor, and a current source coupled in parallel, wherein said controllable switch is turned on by said first comparison circuit when said first sampling voltage is higher than said second sampling voltage, and wherein a voltage across said charging capacitor is configured as said ramp voltage; and
  c) said second comparison circuit is configured to activate said enable controlling signal when said ramp voltage is higher than said reference voltage.

5. The synchronous rectification circuit of claim 3, wherein said enable controlling circuit further comprises a flip-flop having a set terminal configured to receive an output from said second comparison circuit, a reset terminal configured to receive a synchronous rectification off signal, and an output configured as said enable controlling signal.

6. The synchronous rectification circuit of claim 3, wherein said enable controlling circuit further comprises a clamping circuit configured to clamp said second sampling voltage.

7. The synchronous rectification circuit of claim 6, wherein said clamping circuit comprises a diode and a clamping voltage source coupled in series, wherein an anode of said diode is coupled to said second sampling voltage.

8. The synchronous rectification circuit of claim 1, wherein said reference voltage is configured to be generated by a constant current source and an adjustable resistor coupled in parallel, and wherein a value of said adjustable resistor is adjusted in accordance with an output load, and a voltage across said adjustable resistor is configured as said reference voltage.

9. The synchronous rectification circuit of claim 1, wherein said driving circuit comprises an AND-gate configured to receive said enable controlling signal and said synchronous rectification open signal.

10. A method of controlling a synchronous rectifier, the method comprising:
   a) generating a first sampling voltage by sampling a voltage between first and second power terminals of said synchronous rectifier;
   b) generating a second sampling voltage by delaying said first sampling voltage;
   c) activating a ramp voltage when said first sampling voltage is higher than said second sampling voltage;
   d) generating an enable controlling signal by comparing said ramp voltage against a reference voltage that represents a predetermined light load condition; and
   e) activating a driving signal to turn on said synchronous rectifier when said enable controlling signal and a synchronous rectification open signal are active.

11. The method of claim 10, wherein said generating said first sampling voltage comprises sampling a voltage of said first power terminal of said synchronous rectifier when said second power terminal is coupled to ground.

12. The method of claim 10, wherein said generating said second sampling voltage comprises:
   a) delaying said first sampling voltage to generate an intermediate sampling voltage; and
   b) clamping said intermediate sampling voltage to generate said second sampling voltage.

13. The method of claim 10, wherein said activating said ramp voltage comprises charging a capacitor by a current source when said first sampling voltage is higher than said second sampling voltage, wherein a voltage across said capacitor is configured as said ramp voltage.

14. The method of claim 10, wherein said generating said enable controlling signal comprises activating said enable controlling signal by activating a set terminal of a flip-flop, and deactivating a reset terminal of said flip-flop.

15. The method of claim 10, wherein said generating said enable controlling signal comprises charging an adjustable resistor by a constant current source, wherein said adjustable resistor is configured to be adjusted in accordance with an output load, wherein a voltage across said adjustable resistor is configured as said reference voltage.

* * * * *